(12) United States Patent
Yamada et al.

(10) Patent No.: US 9,315,119 B2
(45) Date of Patent: Apr. 19, 2016

(54) SEAT SLIDING DEVICE FOR VEHICLE

(75) Inventors: Yukifumi Yamada, Toyota (JP); Naoki Goto, Tokai (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 153 days.

(21) Appl. No.: 14/131,350

(22) PCT Filed: Jun. 27, 2012

(86) PCT No.: PCT/JP2012/066427
§ 371 (c)(1),
(2), (4) Date: Jan. 7, 2014

(87) PCT Pub. No.: WO2013/008630
PCT Pub. Date: Jan. 17, 2013

(65) Prior Publication Data
US 2014/0145054 A1     May 29, 2014

(30) Foreign Application Priority Data

Jul. 12, 2011    (JP) ................................. 2011-154133

(51) Int. Cl.
*F16M 13/00* (2006.01)
*B60N 2/07* (2006.01)
*B60N 2/08* (2006.01)

(52) U.S. Cl.
CPC ............... *B60N 2/07* (2013.01); *B60N 2/0705* (2013.01); *B60N 2/0715* (2013.01); *B60N 2/08* (2013.01); *B60N 2/085* (2013.01); *B60N 2/0818* (2013.01); *B60N 2/0887* (2013.01)

(58) Field of Classification Search
CPC .. B60N 2/0705; B60N 2/0818; B60N 2/0875; B60N 2/43; B60N 2/4214; B60N 2/42709; B60N 2/433; B60N 2/0881; B60N 2/07
See application file for complete search history.

(56) References Cited

U.S. PATENT DOCUMENTS

| 6,349,914 | B1 | 2/2002 | Yoshida et al. | |
| 7,717,392 | B2 * | 5/2010 | Sakakibara et al. | 248/429 |
| 2012/0205512 | A1 * | 8/2012 | Fujishiro et al. | 248/429 |

FOREIGN PATENT DOCUMENTS

| JP | 2000 142189 | 5/2000 |
| JP | 4355963 | 11/2009 |
| JP | 2011 79414 | 4/2011 |

OTHER PUBLICATIONS

U.S. Appl. No. 14/131,334, filed Jan. 7, 2014, Yamada et al.

(Continued)

*Primary Examiner* — Amy Sterling
(74) *Attorney, Agent, or Firm* — Oblon, McClelland, Maier & Neustadt, L.L.P.

(57) ABSTRACT

A seat sliding device for a vehicle includes a first rail and a second rail coupled to the first rail to make relative movement with respect to the first rail. A lever is coupled to the second rail to rotate about an axis extending in the widthwise direction, and a lock plate which is fixed to the rear end part of the lever part and arranged between first side wall parts to extend in the widthwise direction astride side wall part through holes and folded wall part through holes. At both edge parts of the lock plate in the widthwise direction, there is formed a latching part which engages with a latched part of the first rail when the lever part rotationally moves in one direction and is released from the latched part when the lever part rotationally moves in the other direction.

2 Claims, 5 Drawing Sheets

(56) References Cited

OTHER PUBLICATIONS

International Preliminary Report on Patentability issued Jan. 14, 2014 in PCT/JP2012/066427 filed Jun. 27, 2012.

Written Opinion issued Jul. 31, 2012 in PCT/JP2012/066427 filed Jun. 27, 2012 (English translation only).
International Search Report Issued Jul. 31, 2012 in PCT/JP12/066427 Filed Jun. 27, 2012.

* cited by examiner

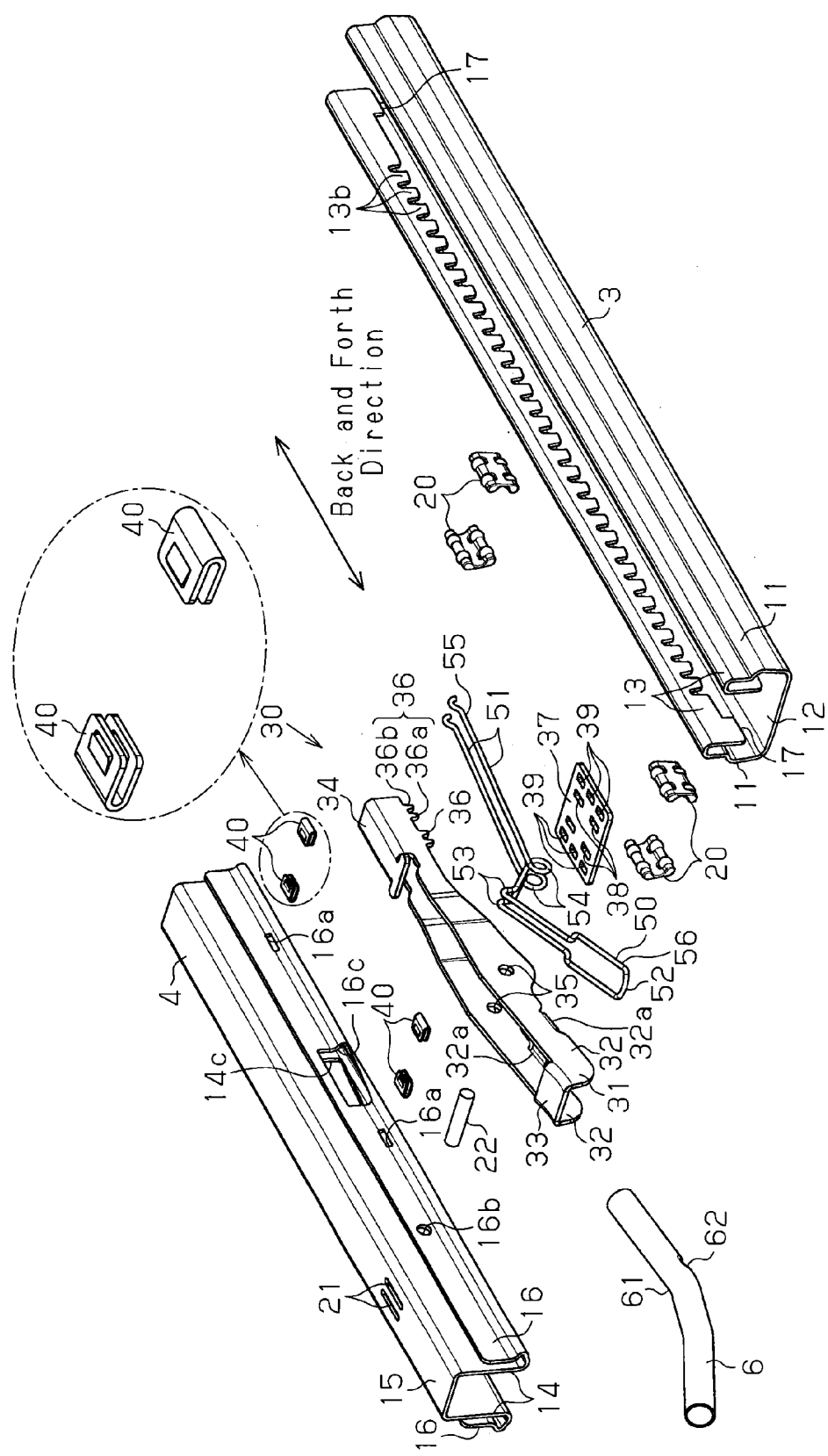

SEAT SLIDING DEVICE FOR VEHICLE

FIELD OF THE INVENTION

The present invention relates to a seat sliding device for a vehicle, which is to adjust the relative position between a vehicle floor and a seat.

BACKGROUND OF THE INVENTION

There have been so far proposed various types of a seat sliding device for a vehicle. For example, a seat sliding device for a vehicle disclosed in Patent Document 1 is provided with a lower rail which has an opening that is opened upward, the cross section of which is substantially U-shaped, and an upper rail which blocks the opening, the cross section of which is substantially U-shaped. The lower rail engages with the upper rail to slide with each other in a longitudinal direction. And, a lock lever is supported on the upper rail.

That is, the lock lever is provided with a rivet arranged inside a U-shaped cross section of an attachment part of the lock lever and a spring pin, which penetrates through the attachment part, and also the rivet in a widthwise direction. The rivet is crimped and joined to a top plate of the upper rail, by which the lock lever is coupled to the upper rail to rotationally move about the spring pin.

The lock lever is integrally provided with a latch part which is capable of entering into notches formed at a lower part of the upper rail in association with rotational movement about the spring pin. The latch part spreads substantially all over the upper rail in the widthwise direction thereof. Then, a lock hole into which a latched part that is formed on the lower rail can be fitted in association with the rotational movement of the lock lever about the spring pin is formed at the latch part.

The lock lever is connected to an operating lever which is inserted from a distal end part of the upper rail. Further, a lock spring composed of blade springs is provided with one end part which is held between the top plate of the upper rail and the rivet. The lock lever is pressure-contacted by the other end part of the lock spring and thereby constantly urged in a direction in which the latch part of the lock lever enters into the notches of the upper rail and also in a direction in which the latched part of the lower rail is fitted into the lock hole.

Therefore, the lock lever is urged by the lock spring to rotationally move, the latch part thereof enters into the notches of the upper rail and the latched part of the lower rail is also fitted into the lock hole. Thereby, restrictions are placed on movement of the upper rail which supports the lock lever with respect to the lower rail. Accordingly, restrictions are placed on movement of a seat with respect to a vehicle floor in the longitudinal direction of the rails. In other words, the seat is locked.

On the other hand, a release operation force is input from the operating lever. Thereby, when the lock lever rotationally moves against an urging force of the lock spring in a direction in which the latch part of the lock lever is detached from the notches of the upper rail and also in a direction in which the latched part of the lower rail is detached from the lock hole, restrictions on movement of the upper rail with respect to the lower rail are released. Thereby, the seat is allowed to move to the vehicle floor in the longitudinal direction of the rails. In other words, the seat is unlocked.

As so far described, it is possible to adjust and retain the seat at such a required position, at which a passenger sits favorably.

PRIOR ART DOCUMENTS

Patent Documents

Patent Document 1: Japanese Patent No. 4355963

SUMMARY OF THE INVENTION

Moreover, the notches of the upper rail allow a lower part of the upper rail to open widely so that the latch part of the lock lever which extends in the widthwise direction can enter in the widthwise direction substantially all over the length of the upper rail (between two flange parts (11c)). In this case, the notches are given as stress concentrating sites on application of bending loads to the upper rail, thus inevitably resulting in a significant decrease in bending strength of the upper rail.

An object of the present invention is to provide a seat sliding device for a vehicle in which, while a lock plate for restricting relative movement between rails is penetrated into one of the rails in the widthwise direction, the rail concerned can be suppressed from a decrease in bending strength.

In order to achieve the above object, a first aspect of the present invention provides a seat sliding device for a vehicle including a first rail, a second rail, a lever part, a lock plate, and an urging member. The first rail is configured to be fixed to one of a vehicle floor and a seat. The second rail is configured to be fixed to the other one of the vehicle floor and the seat and coupled to the first rail to make relative movement with respect to the first rail. The first rail has a pair of first side wall parts arranged in parallel in the widthwise direction, a first coupling wall part, which couples base ends of the first side wall parts in which the base ends are spaced away from the second rail, two first folded wall parts, which individually extend inward in the widthwise direction facing each other from distal ends of the first side wall parts and are folded toward the base ends of the first side wall parts, and a latched part, which is formed at a distal end of each of the first folded wall parts. The second rail has a pair of second side wall parts arranged in parallel in the widthwise direction between the first side wall parts, a second coupling wall part, which couples base ends of the second side wall parts in which the base ends are spaced away from the first rail, two second folded wall parts, which individually extend outward in the widthwise direction spaced away from each other from distal ends of the second side wall parts and are folded to be enclosed with the first side wall parts and the first folded wall parts, and a pair of side wall part through holes and a pair of folded wall part through holes, which are arranged to face each other in the widthwise direction and respectively formed on the second side wall parts and the second folded wall parts. The lever part is arranged between the second side wall parts and is coupled to the second rail to rotate about an axis extending in the widthwise direction. The lock plate is fixed to a distal end part of the lever part and arranged between the first side wall parts to extend in the widthwise direction astride the side wall part through holes and the folded wall part through holes. The latching part is formed at both edge parts of the lock plate in the widthwise direction, engages with the latched part when the lever part rotationally moves in one direction and is released from the latched part when the lever part rotationally moves in the other direction. The urging member urges so that the latching part engages with the latched part.

A second aspect of the present invention provides a seat sliding device for a vehicle which is installed on a vehicle having a floor and a seat. The seat sliding device for a vehicle includes a first rail, a second rail, a lever part, a lock plate, and a latching part. The first rail is adapted to be fixed to one of the floor and the seat. The first rail has a pair of first wall parts arranged in parallel in the widthwise direction of the vehicle, a first coupling part, which couples base ends of the first wall parts, two first folded parts, which individually extend from distal end parts of the first wall parts inward in the widthwise direction of the vehicle and are folded toward base end parts of the corresponding first wall parts, and a latched part, which is formed at a distal end of each of the first folded parts. The second rail is adapted to be fixed to the other one of the floor and the seat and coupled to the first rail to make relative movement with respect to the first rail. The second rail has a pair of second wall parts arranged in parallel between the first wall parts in the widthwise direction of the vehicle, a second coupling part, which couples base ends of the second wall parts, two second folded parts, which individually extend from distal end parts of the second wall parts outward in the widthwise direction of the vehicle and are folded to be enclosed with the corresponding first wall parts and the first folded parts, and a pair of first holes and a pair of second holes, which are arranged to face in the widthwise direction of the vehicle and respectively formed on the second wall parts and at the second folded parts. The lever part is arranged between the second wall parts and coupled to the second rail to rotate about an axis extending in the widthwise direction of the vehicle. The lock plate is fixed to a distal end part of the lever part and arranged between the first wall parts to extend in the widthwise direction of the vehicle astride between the first holes and the second holes. The latching part is formed at both edge parts of the lock plate in the widthwise direction of the vehicle, engages with the latched part when the lever part rotationally moves in one direction and is released from the latched part when the lever part rotationally moves in the other direction. The urging member urges the lock plate so that the latching part engages with the latched part.

According to the respective above-described aspects, when the lever part coupled to the second rail rotationally moves in one direction by the urging force of the urging member and the latching part of the lock plate engages with the latched part of the first rail, restrictions are placed on relative movement between the first rail and the second rail. On the other hand, when the lever part coupled to the second rail rotationally moves in the other direction against the urging force of the urging member and the latching part of the lock plate is released from the latched part of the first rail, the restrictions on the relative movement between the first rail and the second rail are released. In these cases, the side wall part through holes and the folded wall part through holes have a closed shape for avoiding interference with the lock plate. Thereby, it is possible to suppress a decrease in bending strength of the second rail as compared with a case that they have an open (opening) shape, for example, like a conventional example.

BRIEF DESCRIPTION OF THE DRAWINGS

FIG. 2 is an exploded perspective view which shows the seat sliding device in FIG. 1.
FIG. 2(*a*) is an enlarged view of FIG. 2.
FIG. 3(*b*) is a longitudinal sectional view which shows the same embodiment.
FIG. 4(*b*) is a sectional view taken along the line 4B-4B in FIG. 3(*a*).
FIG. 4(*c*) is a sectional view taken along the line 4C-4C in FIG. 3(*a*).
FIG. 5(*b*) is a side view which shows a lock lever.
FIG. 5(*c*) is an enlarged view which shows a range D given in FIG. 5(*b*).

DETAILED DESCRIPTION OF THE PREFERRED EMBODIMENTS

Figure 1:
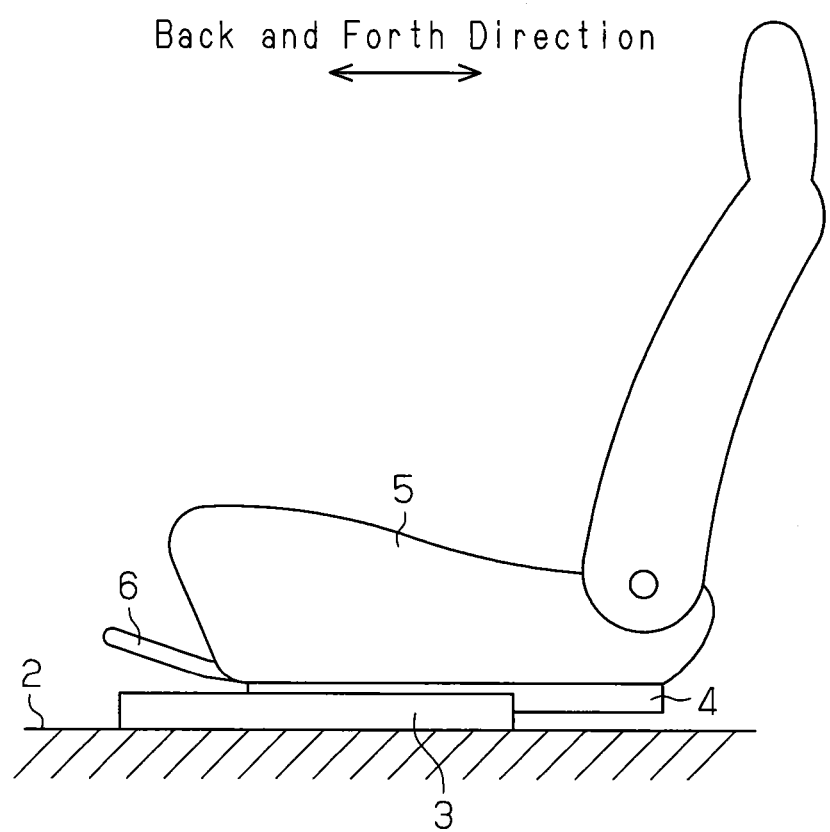
FIG. 1 is a side view which shows a seat sliding device and a seat for a vehicle in the present invention.

A description will be given of one embodiment of the present invention with reference to FIG. 1 to FIG. 5. As shown in FIG. 1, a lower rail 3 as a first rail is fixed on a vehicle floor 2 in such a manner to extend in the back and forth direction of a vehicle. An upper rail 4 as a second rail is attached to the lower rail 3 to make relative movement with respect to the lower rail 3 in the back and forth direction.

A pair of the lower rail 3 and the upper rail 4 shown in FIG. 1 is one of two pairs placed in the widthwise direction of the vehicle (a direction orthogonal to the space in FIG. 1), with an interval therebetween. In this case, there is shown the pair arranged on the left side with respect to the front. A seat 5 on which a passenger sits is fixed and supported on the upper rails 4. Normally, relative movement of the upper rail 4 with respect to the lower rail 3 is kept restricted in principle. There is arranged a release handle 6 which releases the restricted state.

As shown in FIG. 2, the lower rail 3 is provided with a pair of first side wall parts 11 which are composed of plate members and vertically extend to both sides in the widthwise direction and a first coupling wall part 12, which couples base ends of the first side wall parts 11, that is, both lower ends. A first folded wall part 13 which extends internally in the widthwise direction and is folded toward the base end of each of the first side wall parts 11 is formed at a distal end of each of the first side wall parts 11, that is, at an upper end thereof, to continue to the first side wall part 11.

Figure 4A:
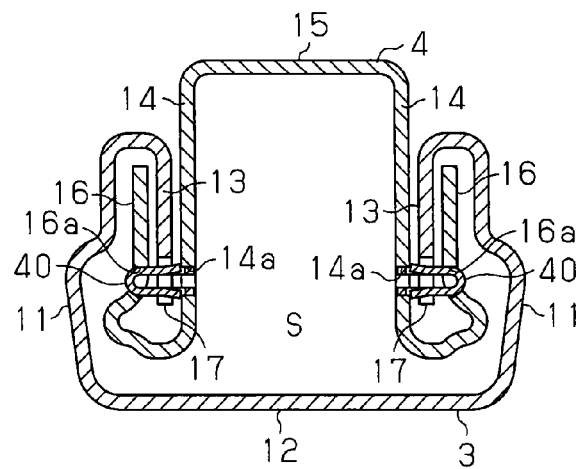
FIG. 4(*a*) is a sectional view taken along the line 4A-4A in FIG. 3(*a*).
Figure 4B:
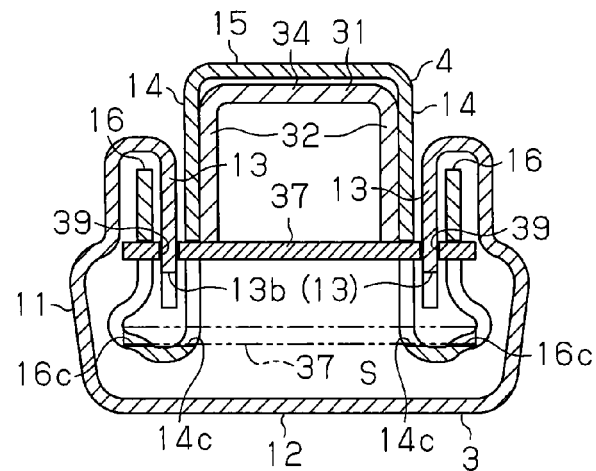
Figure 4C:
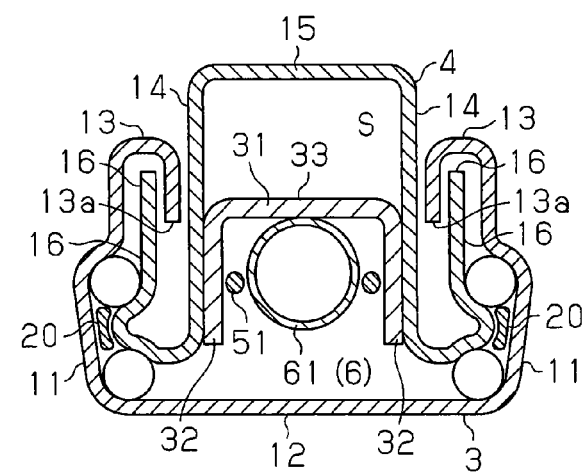

The upper rail 4 is provided with a pair of second side wall parts 14 which are composed of plate members and vertically extend between the first folded wall parts 13 of the lower rail 3 and a second coupling wall part 15, which couples the base ends of the second side wall parts 14 in which the base ends of the second side wall parts 14 are spaced away from the lower rail 3, that is, both upper ends thereof, as shown together in FIG. 4(*a*) to FIG. 4(*c*). Then, a second folded wall part 16 which extends outward in the widthwise direction and is folded to be enclosed by the first side wall part 11, and the first folded wall part 13 is formed at a distal end of each of the second side wall parts 14, that is, at a lower end thereof, in such a manner to continue to the second side wall part 14.

That is, each of the lower rail 3 and the upper rail 4 is provided with a substantially U-shaped cross section, and these rails are butted together so that their opening parts face each other. The rails are prevented from being detached in the vertical direction mainly by engagement between the first folded wall parts 13 and the second folded wall parts 16. The lower rail 3 and the upper rail 4 configure a rail cross section which assumes substantially a rectangular box shape. The lower rail 3 configures an inner space S together with the upper rail 4.

As shown in FIG. 3(*a*) and FIG. 4(*c*), a pair of rolling members 20 are attached in the back and forth direction between each of the second folded wall parts 16 and each of the first side wall parts 11 which faces thereto. The upper rail 4 is supported to be slidable with respect to the lower rail 3 in the longitudinal direction (in the back and forth direction) in such a manner that the rolling members 20 are rolled between the upper rail 4 and the lower rail 3.

Figure 3A:
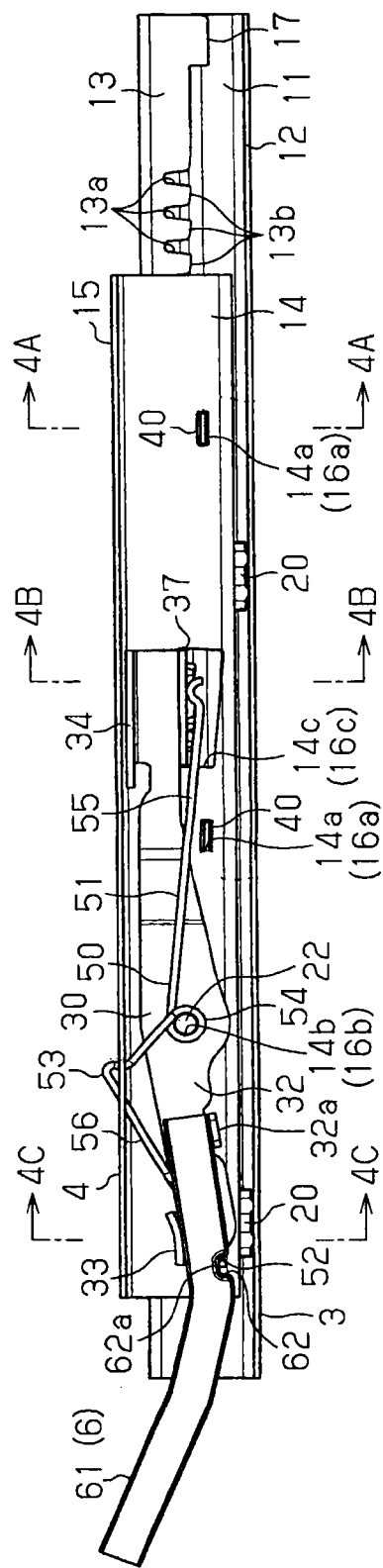
FIG. 3(*a*) is a longitudinal sectional view which shows the same embodiment.
Figure 3B:
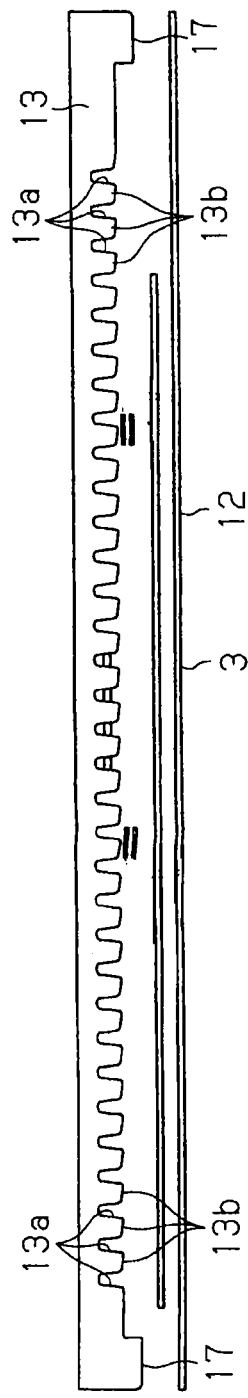

As shown in FIG. 3(a) and FIG. 3(b), a plurality of notches 13a extending upward from the distal end of the lower rail 3, that is, from the lower end thereof, are formed at an intermediate part of each of the first folded wall parts 13 of the lower rail 3 in the longitudinal direction, with a predetermined interval kept therebetween in the longitudinal direction. Rectangular tooth-like lock pawls 13b are individually formed as latched parts between respective adjacent notches 13a. Thus, the plurality of lock pawls 13b are arranged in parallel in the longitudinal direction of the lower rail 3, with the above-described predetermined interval kept therebetween. Also, a restriction part 17 extending further downward in a stepwise manner from the distal end of the first folded wall part 13, that is, from the lower end thereof, is formed at each end of the first folded wall parts 13 of the lower rail 3 in the longitudinal direction. As a matter of course, all the plurality of lock pawls 13b are arranged to be held between the restriction parts 17 of the lower rail 3 (first folded wall parts 13) in the longitudinal direction.

Two side wall part attachment holes 14a are formed at an intermediate part of each of the second side wall parts 14 of the upper rail 4 in the longitudinal direction, with an interval therebetween in this direction. Further, as also shown in FIG. 4(a), a folded wall part attachment hole 16a is formed at each of the second folded wall parts 16 of the upper rail 4 to face each of the side wall part attachment holes 14a in the widthwise direction. The side wall part attachment hole 14a and the folded wall part attachment hole 16a are arranged in the vertical direction between the lower end of the first folded wall part 13 (lock pawl 13b) and the lower end of the restriction part 17.

A latch member 40 is inserted into the side wall part attachment hole 14a and the folded wall part attachment hole 16a adjacent to each other in the widthwise direction in a manner to bridge the second side wall part 14 and the second folded wall part 16 in the widthwise direction. The latch member 40 is made of, for example, a blade spring prepared by folding a metal plate member into a U-shape. When the latch member 40 is assembled to the upper rail 4, the lower rail 3 and the upper rail 4 are assembled in advance so that the side wall part attachment hole 14a and the folded wall part attachment hole 16a are arranged between the restriction parts 17 in the longitudinal direction. In this state, the latch member 40 is sequentially inserted into the side wall part attachment hole 14a and the folded wall part attachment hole 16a from inside the upper rail 4 outward in the widthwise direction. Thereby, the latch member 40 is retained on the upper rail 4.

Here, as a matter of course, the latch member 40 bridges the second side wall part 14 and the second folded wall part 16 in the widthwise direction opens a movement orbit of the first folded wall part 13 and cuts across a movement orbit of the restriction part 17 in a direction in which the lower rail 3 and the upper rail 4 make relative movement. Therefore, when the lower rail 3 and the upper rail 4 make relative movement, the corresponding restriction part 17 and the latch member 40 are brought into contact to restrict the movement. Thereby, a distance of relative movement between the lower rail 3 and the upper rail 4 is restricted within a predetermined range.

As shown in FIG. 2, a circular shaft attachment hole 16b which is located further forward than the folded wall part attachment hole 16a on the front side is formed at each of the second folded wall parts 16 of the upper rail 4. A fan-shaped through hole 16c centering on the shaft attachment hole 16b in an intermediate part between the folded wall part attachment holes 16a is also formed at each of the second folded wall parts 16, as a folded wall part through hole. A pair of slit-like supporting holes 21 which are arranged in the widthwise direction in parallel further forward than the shaft attachment hole 16b are formed on the second coupling wall part 15 of the upper rail 4. Both supporting holes 21 extend in the back and forth direction.

Further, as shown in FIG. 3(a), a circular shaft attachment hole 14b which is concentric with the shaft attachment hole 16b is formed at each of the second side wall parts 14 of the upper rail 4. Still further, a fan-shaped through hole 14c centering on the shaft attachment hole 14b in an intermediate part between the side wall part attachment holes 14a is formed at each of the second side wall parts 14, as a side wall part through hole. The shaft attachment holes 14b, 16b are mutually equal in inner diameter, and the through holes 14c, 16c are, as also shown in FIG. 4(b), mutually similar in shape and face in the widthwise direction. That is, these through holes 14c and 16c assume a substantially congruent fan-shape (closed shape) when viewed laterally.

As shown in FIG. 3(a), a lock lever 30 is coupled inside the upper rail 4 by a cylindrical support pin 22 with a center line extending in the widthwise direction to rotate. That is, as shown in FIG. 2, the lock lever 30 is provided with a handgrip part 31 as a lever part composed of a plate member extending in the back and forth direction. The handgrip part 31 is extended in such a manner that two vertical wall parts 32 are arranged in parallel in the widthwise direction all over the length thereof in the longitudinal direction. A distance between the vertical wall parts 32 in the widthwise direction is set smaller than a distance between the second side wall parts 14 of the upper rail 4 in the widthwise direction. Then, each of the vertical wall parts 32 is such that an upper end edge space is connected in the widthwise direction by a retention wall 33 at each of the front end parts and the upper end edge space is also connected in the widthwise direction by a top plate part 34 at each of the rear end parts, the top plate part 34 each being a coupling wall or a restriction wall part. Then, a circular shaft attachment hole 35 which is concentric with the support pin 22 (shaft attachment holes 14b, 16b) is formed at each of the vertical wall parts 32. The support pins 22, the ends of which are inserted into the shaft attachment holes 14b, 16b, are inserted into and supported by the shaft attachment holes 35, by which the handgrip part 31 is coupled to the upper rail 4 to rotate.

Figure 5A:
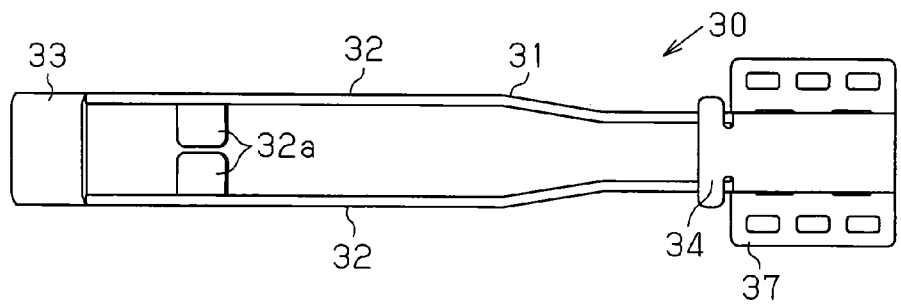
FIG. 5(*a*) is a plan view which shows a lock lever.
Figure 5B:
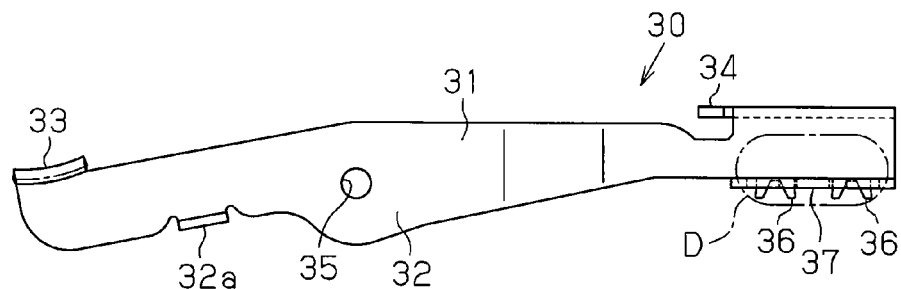

As shown in both FIG. 5(a) and FIG. 5(b), it is noted that the retention wall 33 assumes a circular-arc shape which is raised downward when viewed laterally. Further, each of the vertical wall parts 32 is provided with a flange-shaped supporting wall 32a which protrudes internally in the widthwise direction and facing each other from a lower end edge between the retention wall 33 and the shaft attachment hole 35 in the back and forth direction.

Figure 5C:
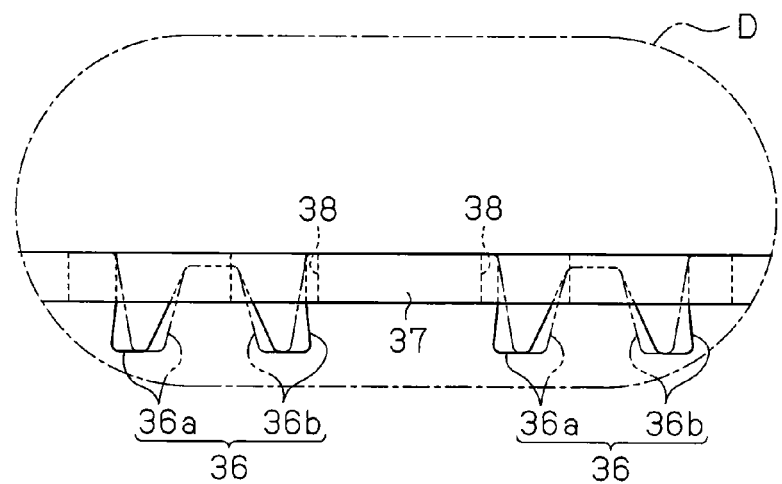

As shown in FIG. 5(c) in an enlarged manner, a pair of joining parts 36 as engagement protruding pieces protrude at each of the vertical wall parts 32 downward from a lower end of the rear end part thereof which is below the top plate part 34, with an interval therebetween in the back and forth direction. Each of the joining parts 36 is configured so that a pair of joining pieces 36a, 36b arranged to be adjacent in the back and forth direction are given as one set. On the other hand, the lock lever 30 is provided with a flat-plate like lock plate 37 which spreads in the back and forth direction and in the widthwise direction in such a manner to penetrate through the through holes 14c, 16c. Four slit-like joining holes 38 as engagement holes which open in the vertical direction to face the respective joining parts 36 are formed on the lock plate 37.

On assembly, the lock plate 37 is inserted into the through holes 14c, 16c in the widthwise direction, for example, in such a state that the handgrip part 31 is supported in advance on the upper rail 4, and arranged below the vertical wall parts 32. Then, in this state, after insertion of a corresponding joining part 36 into each of the joining holes 38 in the vertical direction, for example, distal ends of both joining pieces 36a, 36b which penetrate through the joining hole 38 are crimped to open in the back and forth direction, thereby, the lock plate 37 is fastened and fixed to the handgrip part 31. Therefore, as shown in FIG. 4(b), the rear end of the handgrip part 31 forms a substantially rectangular closed-cross section (closed cross section) together with the lock plate 37, the vertical wall parts 32 and the top plate part 34.

Further, a plurality of lock holes 39 (three holes) as latch parts which are arranged in parallel in the back and forth direction outward from the joining part 36 in the widthwise direction are formed on the lock plate 37, with the predetermined interval therebetween. As also shown in FIG. 4(b), each of the lock holes 39 is opened in the vertical direction to face the first folded wall part 13 and arranged at a position that can be in alignment with each of a plurality of lock pawls 13b (three pawls) adjacent in the longitudinal direction of the lower rail 3.

Then, as shown by the solid line in FIG. 4(b), when the lock lever 30 rotationally moves about the support pin 22 so that the lock plate 37 ascends, each of the lock holes 39 is able to accept a corresponding lock pawl 13b. When each of the lock holes 39 accepts the corresponding lock pawl 13b, restrictions are placed on relative movement between the lower rail 3 and the upper rail 4. On the other hand, as shown by the chain double-dashed line in FIG. 4(b), when the lock lever 30 rotationally moves about the support pin 22 so that the lock plate 37 descends, each of the lock holes 39 is detached from the corresponding lock pawl 13b. At this time, restrictions on relative movement between the lower rail 3 and the upper rail 4 are released.

When the lock lever 30 rotationally moves about the support pin 22 in a direction in which a lock pawl 13b corresponding to each of the lock holes 39 is inserted, that is, in a direction in which the lock plate 37 ascends, an upper surface of the top plate part 34 comes close to a lower surface of the second coupling wall part 15 (that is, not in contact). Then, if the lock lever 30 tries to move rotationally more excessively than an original range about the support pin 22, the lock lever 30 undergoes elastic deformation and the upper surface of the top plate part 34 is finally brought into contact with the lower surface of the second coupling wall part 15 to restrict the rotational movement. This is because, for example, when the lock plate 37 is fastened to the vertical wall parts 32 in the vertical direction as described above, sway of the handgrip part 31 about the axis is limited to a range until the upper surface of the top plate part 34 is in contact with the lower surface of the second coupling wall part 15, thereby smoothly fastening the lock plate 37. In other words, the through holes 14c, 16c through which lock plate 37 penetrates have not only functions to allow rotational movement of the lock plate 37 when relative movement between the lower rail 3 and the upper rail 4 is restricted or released but also functions to allow the rotational movement of the lock plate 37 in a certain range when both the vertical wall parts 32 and the lock plate 37 are fastened.

As shown in FIG. 2, a wire spring 50 composed of a single linear element is arranged inside the upper rail 4. The wire spring 50 is formed in a substantially U-letter shape which opens backward in a planar view. It is provided with two extension parts 51 which are symmetrical and extend in the back and forth direction and also provided with a connection part 52 which connects front ends of the extension parts 51 in the widthwise direction. As also shown in FIG. 3(a), the wire spring 50 is provided with a fixing part 53 which protrudes by bending an intermediate part of each of the extension parts 51 upward in the longitudinal direction and also provided with a coil part 54 which is wound clockwise about the support pin 22 toward backward at the rear side of the fixing part 53. Then, the wire spring 50 configures a first urging part 55 at a site further backward than the fixing part 53 of each of the extension parts 51 including the coil part 54 and also forms a second urging part 56 at a site further forward than the connection part 52 and the fixing part 53 of each of the extension parts 51.

The wire spring 50 is arranged substantially inside the handgrip part 31 in such a manner that each of the fixing parts 53 is allowed to protrude from a corresponding supporting hole 21 of the upper rail 4. Further, at the coil part 54, the wire spring 50 is supported via the support pin 22 by the upper rail 4 (the second side wall parts 14). The wire spring 50 is such that each of the fixing parts 53 is brought into contact with the rear end surface of the supporting hole 21, and the rear end part of the first urging part 55 is elastically brought into contact with the lower surface of the lock plate 37 further backward than the coil part 54 (support pin 22). That is, the first urging part 55 is subjected to bending deformation including the coil part 54, with a position which fixes the upper rail 4 (fixing part 53) given as a supporting point, and urging the lock lever 30 by using the fixing position as the supporting point. Therefore, the lock lever 30 is urged by the wire spring 50 (first urging part 55) to rotationally move in a direction in which the lock plate 37 ascends, that is, in a direction in which a lock pawl 13b corresponding to each lock hole 39 is fitted.

The coil part 54 is placed at the first urging part 55. This is because an elastic coefficient on bending deformation is practically reduced, while the extension length of the first urging part 55 is suppressed in the back and forth direction. The fixing parts 53 of the wire spring 50 are kept out of contact with the front end surface of the supporting hole 21. Then, the connection part 52 of the wire spring 50 (second urging part 56) is arranged further forward than the retention wall 33.

The release handle 6 is made by bending a tubular member and formed to bridge the upper rails 4 at the front side thereof in the widthwise direction. As shown in FIG. 2, a distal end part 61 extending at the back of the release handle 6 assumes a cylindrical shape, the outer diameter of which is smaller than a distance between the vertical wall parts 32 in the widthwise direction. And, a slit-like supporting groove 62 extending in the widthwise direction is formed at the lower part of the distal end part 61.

As shown in FIG. 3(a), the release handle 6 is inserted below the retention wall 33 of the handgrip part 31 (lock lever 30) to which each of the distal end parts 61 corresponds and above the supporting walls 32a, that is, between the vertical wall parts 32. Then, the distal end part 61 is latched and retained by the connection part 52 of the wire spring 50 which is fitted into the supporting groove 62. That is, the rear end surface 62a of the supporting groove 62 is given as an engagement surface with the connection part 52 for suppressing detachment of the distal end part 61 of the release handle 6. Further, the distal end part 61 inserted between the vertical wall parts 32 is arranged to face the support pin 22 on a backward extension line thereof. Thereby, even where the distal end part 61 is excessively inserted between the vertical wall parts 32, it is restricted to a predetermined range until the distal end part 61 is in contact with the support pin 22.

Then, the distal end part 61 inserted between the vertical wall parts 32 is urged on the supporting groove 62 by the wire spring 50 to ascend, by which the distal end part 61 is retained to rotate integrally with the lock lever 30 substantially about the support pin 22 in such a manner that an upper part and a lower part of the distal end part 61 are respectively brought into contact with a lower surface of the retention wall 33 and upper surfaces of the supporting walls 32a. That is, the wire spring 50 is also provided with functions to keep the release handle 6 elastically so that the release handle 6 makes an integral rotation with the lock lever 30. The distal end part 61 (release handle 6) is elastically retained by the connection part 52 of the wire spring 50. This is because the release handle 6 is coupled to the lock lever 30 to give a sense of appropriate moderation to a user who operates the release handle 6. Alternatively, this is because when the distal end part 61 (release handle 6) tries to make rotational movement about the support pin 22 in a direction reverse to an original operating direction due to an unintended external force, etc., the distal end part 61 is allowed to sway with respect to the lock lever 30, thereby avoiding an excessively large load on the lock lever 30. Further, the connection part 52 of the wire spring 50 (second urging part 56) which latches the distal end part 61 of the release handle 6 is arranged further forward than the retention wall 33. This is because the release handle 6 is suppressed from swaying about the connection part 52 with respect to the lock lever 30.

Next, a description will be given of actions of the present embodiment.

First, the release handle 6 is assumed to be released from an operating force thereof. The lock lever 30 is allowed to rotationally move by an urging force of the wire spring 50 (the first urging part 55) in a direction in which the lock plate 37 ascends about the support pin 22 integrally with the distal end part 61 (release handle 6), that is, in a direction in which a corresponding lock pawl 13b is fitted into each of the lock holes 39. Thereby, restrictions are placed on relative movement between the lower rail 3 and the upper rail 4 in the above-described manner. Then, there is retained a position of the seat 5 which is supported by the upper rail 4 in the back and forth direction.

Here, the release handle 6 is assumed to be operated to raise a front end thereof. At this time, against the urging force of the wire spring 50 (the first urging part 55), the lock lever 30 is allowed to rotationally move integrally with the distal end part 61 (release handle 6) in a direction in which the lock plate 37 descends about the support pin 22, that is, to a side where each of the lock holes 39 is detached from a corresponding lock pawl 13b. Thereby, restrictions on relative movement between the lower rail 3 and the upper rail 4 are released in the above-described manner. Then, it is possible to adjust a position of the seat 5 supported by the upper rail 4 in the back and forth direction. In particular, in these cases, the lock plate 37 is subjected to idle running inside the through holes 14c, 16c, thereby avoiding interference with the lock plate 37.

As so far described in detail, the present embodiment is able to provide the following effects.

(1) The through holes 14c, 16c have a closed shape to avoid interference with lock plate 37 when the handgrip part 31 coupled to the upper rail 4 rotationally moves about the support pin 22. It is, thereby, possible to suppress a decrease in bending strength of the upper rail 4, as compared with a case where the holes have an open (opening) shape, for example, in the conventional devices described in the background art.

(2) The vertical wall parts 32 and the top plate part 34 configure a closed cross section together with the lock plate 37 to increase the strength, thus making it possible to suppress deformation in which, for example, an end of the lock plate 37 in the widthwise direction deforms in the vertical direction. Then, it is possible to suppress an operating fault in restricting and releasing relative movement between the lower rail 3 and the upper rail 4 by the lock plate 37.

(3) When the lock plate 37 is fastened to the vertical wall parts 32 of the handgrip part 31 in the vertical direction, sway about the axis of the handgrip part 31 is limited to a range until the upper surface of the top plate part 34 is in contact with the lower surface of the second coupling wall part 15. It is, therefore, possible to smoothly fasten the vertical wall parts 32 of the handgrip part 31 and the lock plate 37.

(4) The handgrip part 31 and the lock plate 37 can be fastened in the vertical direction by a very simple method in which distal ends of the plurality of joining parts 36 which individually penetrate through the plurality of joining holes 38 are crimped.

It is noted that the above-described embodiment may be modified in the following.

There has been arranged the top plate part 34 as a restriction wall part which is also used as a coupling wall part. However, it is acceptable that the coupling wall and the restriction wall part are arranged separately or one of them is omitted. It is also acceptable that, for example, in addition to the top plate part 34, there is arranged a coupling wall, which couples an intermediate part between the vertical wall parts 32 in the vertical direction. That is, the rear end part of the handgrip part 31 assumes such a cross section that two rectangles are arrayed vertically, together with the lock plate 37. Alternatively, it is acceptable that in place of the top plate part 34, there is arranged a coupling wall, which couples an intermediate part between the vertical wall parts 32 in the vertical direction. That is, the rear end part of the handgrip part 31 may assume a cross section which is an H-letter shape. In either case, the coupling wall configures a closed cross section together with the vertical wall parts 32 of the handgrip part 31 and the lock plate 37 and is able to increase the strength.

It is acceptable that the vertical wall parts 32 of the handgrip part 31 and the lock plate 37 are fixed by welding, etc.

It is acceptable that a plurality of joining parts placed on the handgrip part 31 are individually given a columnar shape (pin shape) and distal ends of the plurality of columnar (pin-shaped) joining parts which individually penetrate through a plurality of joining holes 38 are crimped to fasten the handgrip part 31 and the lock plate 37 in the vertical direction.

It is acceptable that there are provided any number of joining parts which are arranged in parallel at each of the vertical wall parts 32 of the handgrip part 31 in the back and forth direction and the joining parts are adopted in any appropriate number depending on the fastening strength of the handgrip part 31 to the lock plate 37.

It is acceptable that there are provided any number of lock holes 39 which are arranged in parallel on the lock plate 37 in the back and forth direction and the lock holes 39 are adopted in any appropriate number depending on strength of restriction on relative movement between the lower rail 3 and the upper rail 4 and setting of a required lock releasing stroke.

It is acceptable that the support pin 22 is supported by the lock lever 30 (the vertical wall parts 32), with the end parts thereof fixed to the upper rail 4 (the second side wall parts 14), or fixed to the lock lever 30 (the vertical wall parts 32), with the end parts thereof pivotally supported by the upper rail 4 (the second side wall parts 14).

It is acceptable that the lower rail 3 or the upper rail 4 is configured by a plurality of plate members that are connected by welding, etc.

It is acceptable that a relationship in which the lower rail 3 is fixed to the upper rail 4 and a relationship in which the vehicle floor 2 is fixed to the seat 5 (in other words, a vertical arrangement relationship) are reversed. In this case, it is acceptable that the release operation of the lock lever 30 arranged on the vehicle floor 2 side may be performed by using any suitable operating member such as a cable.

It is acceptable that the lower rail 3 and the upper rail 4 (seat sliding device for a vehicle) are in such a configuration that one each is placed or three or more each are placed with respect to the seat 5.

It is acceptable that in association with relative movement between the lower rail and the upper rail, the seat moves in the widthwise direction of the seat, for example.

DESCRIPTION OF REFERENCE NUMERALS

2 . . . vehicle floor, 5 . . . seat, 3 . . . lower rail (first rail) 4 . . . upper rail (second rail), 11 . . . first side wall part, 12 . . . first coupling wall part, 13 . . . first folded wall part, 13*b* . . . lock pawl (latched part), 14 . . . second side wall part, 14*c* . . . through hole (side wall part through hole), 15 . . . second coupling wall part, 16 . . . second folded wall part, 16*c* . . . through hole (folded wall part through hole), 22 . . . support pin, 30 . . . lock lever, 31 . . . handgrip part (lever part), 32 . . . vertical wall part, 34 . . . top plate part (coupling wall part, restriction wall part), 36 . . . joining part (engagement protruding piece), 37 . . . lock plate, 38 . . . joining hole (engagement hole), 39 . . . lock hole (latching part), 50 . . . wire spring (urging member)

The invention claimed is:

1. A seat sliding device for a vehicle comprising:
a first rail, which is configured to be fixed to one of a vehicle floor and a seat; and
a second rail, which is configured to be fixed to the other one of the vehicle floor and the seat and coupled to the first rail to make relative movement with respect to the first rail, wherein
the first rail has a pair of first side wall parts arranged in parallel in the widthwise direction, a first coupling wall part, which couples base ends of the first side wall parts in which the base ends are spaced away from the second rail, two first folded wall parts, which individually extend inward in the widthwise direction facing each other from distal ends of the first side wall parts and are folded toward the base ends of the first side wall parts, and a latched part, which is formed at a distal end of each of the first folded wall parts, and
the second rail has a pair of second side wall parts arranged in parallel in the widthwise direction between the first side wall parts, a second coupling wall part, which couples base ends of the second side wall parts in which the base ends are spaced away from the first rail, two second folded wall parts, which individually extend outward in the widthwise direction spaced away from each other from distal ends of the second side wall parts and are folded to be enclosed with the first side wall parts and the first folded wall parts, and a pair of side wall part through holes and a pair of folded wall part through holes, which are arranged to face each other in the widthwise direction and respectively formed on the second side wall parts and the second folded wall parts, and
the seat sliding device for a vehicle further comprising:
a lever part, which is arranged between the second side wall parts and is coupled to the second rail to rotate about an axis extending in the widthwise direction;
a lock plate, which is fixed to a distal end part of the lever part and arranged between the first side wall parts to extend in the widthwise direction astride the side wall part through holes and the folded wall part through holes,
a latching part, which is formed at both edge parts of the lock plate in the widthwise direction, engages with the latched part when the lever part rotationally moves in one direction and is released from the latched part when the lever part rotationally moves in the other direction; and
an urging member, which urges so that the latching part engages with the latched part wherein
the lever part is coupled to the second rail to rotate on a s air of vertical wall parts arranged in parallel in the widthwise direction between the second side wall parts and fastened to the lock plate in the vertical direction at the distal ends of the vertical wall parts in which the distal ends of the vertical wall parts are spaced away from the second coupling wall part,
the lever part has a restriction wall part, which couples the base ends of the vertical wall parts coming close to the second coupling wall part at least at a site where the lock plate is fastened, and
the seat sliding device for a vehicle further comprises:
a plurality of engagement protruding pieces which individually protrude from the distal ends of the vertical wall parts in which the distal ends of the vertical wall parts are spaced away from the second coupling wall part, wherein
the lock plate is provided with a plurality of engagement holes which face the plurality of engagement protruding pieces in the vertical direction and individually correspond to the plurality of engagement protruding pieces, and
the lever part and the lock plate are fastened in the vertical direction by individually crimping distal ends of the plurality of engagement protruding pieces which individually penetrate through the plurality of engagement holes.

2. The seat sliding device for a vehicle according to claim 1, wherein
the lever part has a coupling wall which configures a closed cross section together with the lock plate and the vertical wall parts.

* * * * *